United States Patent Office 3,000,937
Patented Sept. 19, 1961

3,000,937
PROCESS FOR THE PRODUCTION OF ARYLBORAZOLES
William D. English, Garden Grove, and Allen L. McCloskey, Orange, Calif., assignors to United States Borax & Chemical Corporation, Los Angeles, Calif., a corporation of Nevada
No Drawing. Filed June 3, 1959, Ser. No. 817,714
2 Claims. (Cl. 260—551)

The present invention relates as indicated to an improved method for making arylborazoles.

The class of materials known as borazoles are heterocyclic hexatomic ring compounds having the general formula $(HB—NH)_3$ and any substituents of the ring are named with "B" or "N" prefixes to designate their positions. The present invention is concerned with a method for producing those borazoles where the "N" are substituted with aryl radicals.

It is well known to those skilled in the art that borazoles having aryl substituents are readily prepared by reaction of B-haloborazoles with Grignard reagents as shown by the following general reactions:

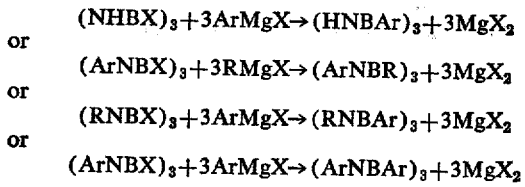

where R is an alkyl radical, Ar is an aryl radical and X is a halogen.

The foregoing equations illustrate reactions which, at first blush, appear to proceed easily and from a study of such reactions it would appear that it is a simple matter to separate the desired borazole from the magnesium halide, which is the other product of the reaction. However, those skilled in the art have found that the above illustrated reactions actually result in a reaction mass wherein the magnesium halide complexes with the desired borazole and the reaction mass is extremely difficult to separate even using special techniques.

The exact complex which forms between the desired borazole and the magnesium halide has not been completely identified; however, by following the teachings of the present invention yields of 70–80% are obtained.

It is immaterial which of the Grignard reagents are reacted with the B-haloborazole, the reaction always results in a complex which must be broken in order to obtain the arylborazole.

It is therefore the principal object of this invention to provide an improved method for producing arylborazoles.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a method for producing arylborazoles which comprises reacting, in an organic solvent, a B-haloborazole selected from the group consisting of $(HNBX)_3$, $(RNBX)_3$ and $(R'NBX)_3$ with a Grignard reagent, adding to the reaction mass from about 0.01 mole to about 1 mole per mole of Grignard reagent of a material selected from the class consisting of tertiary aliphatic amines having alkyl groups of from 2–20 carbon atoms, N,N-dimethyl aniline, pyridine and quinoline and then separating the resultant arylborazole; wherein R is an alkyl radical, R' is an aryl radical and X is a halogen and when said B-haloborazole is $(HNBX)_3$ and $(RNBX)_3$ then said Grignard reagent must contain an aryl radical.

We have found that the borazole-magnesium halide complex can be broken by the addition of a tertiary aliphatic amine having alkyl groups of from 2–20 carbon atoms, N,N-dimethyl aniline, pyridine, or quinoline to the reaction mass. It is our theory that the above amine materials pull the magnesium halide away from the borazole ring and form a new complex which does not interfere with the borazole. The borazole now freed from the complex is readily separated from the reaction mass by any of the well-known techniques such as distillation, extraction and recrystallization or sublimation.

From the foregoing, it becomes apparent that the crux of the present invention is that the borazole-magnesium halide complex is broken by the addition of one of the above tertiary amines and the desired borazole is readily separated from the reaction mass without interference.

This improvement which comprises the crux of the present invention is applicable to any arylborazole which is the result of a reaction betwen any Grignard reagent and any B-haloborazole. Those skilled in the art know that Grignard reagents can be either alkyl magnesium halides or aryl magnesium halides. It is only important to the present invention that when a B-haloborazole such as $(HN—BX)_3$ or $(RN—BX)_3$ is used as one ingredient of the reaction the Grignard reagent used must be of the aryl magnesium halide type.

As for the amine material which breaks the borazole-magnesium halide complex this can be any of tertiary aliphatic amines having alkyl groups of from 2–20 carbon atoms, N,N-dimethyl aniline, pyridine and quinoline. Thus such tertiary aliphatic amines as:

Triethylamine
Triisopropylamine
Tripentylamine
Tridecylamine
Tristearylamine are equally effective in the present invention as well as the other tertiary aliphatic amines which have alkyl groups of from 2–20 carbon atoms.

So that the present invention can be more readily understood, the following examples are given:

I

Phenylmagnesium bromide (25 ml. of 3M solution) was added with stirring to 4.6 g. (0.025 mole) of B-trichloroborazole in 100 ml. of anhydrous ether over a 30-minute period. The reaction mixture was heated under reflux for about 1 hour and then filtered. The ether was then distilled from the filtrate and the resulting residue was extracted with and recrystallized from cyclohexane.

This process resulted in a 20% yield of B-triphenyl-borazole, M.P. 169–174° C.

II

Phenylmagnesium bromide (25 ml. of 3M solution) was added with stirring to 4.6 g. (0.025 mole) of B-trichloroborazole in 100 ml. of anhydrous ether over a 30-minute period. The reaction mixture was refluxed for about 1 hour, 7.6 g. (0.075 mole) of triethylamine was added and reflux with stirring continued for about 3 hours. The resultant reaction mass was filtered, the filtrate was evaporated to dryness and the residual solid was then extracted with and recrystallized from cyclohexane.

The process resulted in a 75% yield of B-triphenyl-borazole, M.P. 179–182° C.

It is of interest to note that the melting point of substantially pure B-triphenylborazole has been shown to be 180–182° C. Thus the present process not only increases the yields of the arylborazoles threefold but also produces a substantially purer product.

III

Example II was repeated except that 0.4 g. (0.004 mole) of triethylamine was used. The results were the same as in Example II.

The foregoing Examples II and III were also repeated using N,N-dimethyl aniline, pyridine and quinoline as the amine with equally good results.

Other modes of applying the principle of the invention may be employed, change being made as regards the details described, provided the features stated in any of the following claims or the equivalent of such be employed.

We, therefore, particularly point out and distinctly claim as our invention:

1. In the method for producing arylborazoles which comprises refluxing, in an organic solvent, a B-haloborazole selected from the group consisting of

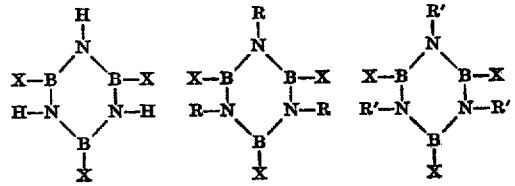

where R is an alkyl radical, R' is an aryl radical and X is halogen with a Grignard reagent and wherein at least one of the reactants contains an aryl group in its molecule, the improvement which comprises adding to the reaction mass from about 0.01 mole to about 1 mole per mole of Grignard reagent of a material selected from the class consisting of tertiary aliphatic amines having alkyl groups of from 2–20 carbon atoms, N,N-dimethyl aniline, pyridine and quinoline.

2. In the method of producing B-triphenylborazole which comprises heating at reflux B-trichloroborazole and phenylmagnesium bromide in ether, the improvement which consists essentially of adding to the reaction mass from about 0.01 mole to about 1.0 mole per mole of phenylmagnesium bromide of triethylamine.

References Cited in the file of this patent

UNITED STATES PATENTS 2,821,463    Scott et al. _____ Jan. 28, 1958

OTHER REFERENCES

Puxeddu: Chemisches Zentralblatt (1924), [1] page 1923.

Noller: Chemistry of Organic Compounds (1952), page 104, 1st Edition, W. B. Saunders Co.

Groszos et al.: Journal of the American Chemical Society, vol. 80: pages 1358 and 1360 (1958).